Jan. 1, 1963  H. E. BRANKER  3,071,761
VEHICULAR COURSE INDICATOR
Filed Oct. 2, 1957  3 Sheets-Sheet 1

INVENTOR
HOFFMAN E. BRANKER
BY
ATTORNEY

Jan. 1, 1963  H. E. BRANKER  3,071,761
VEHICULAR COURSE INDICATOR
Filed Oct. 2, 1957  3 Sheets-Sheet 2
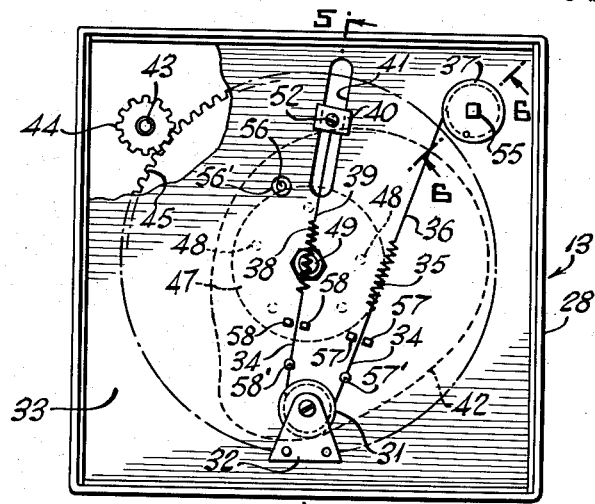
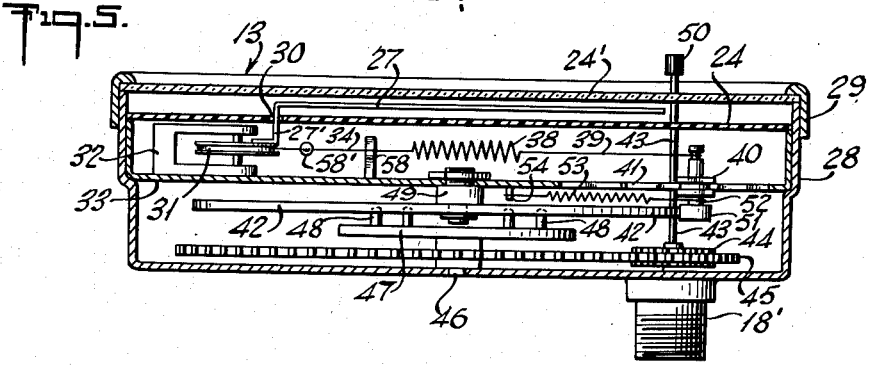
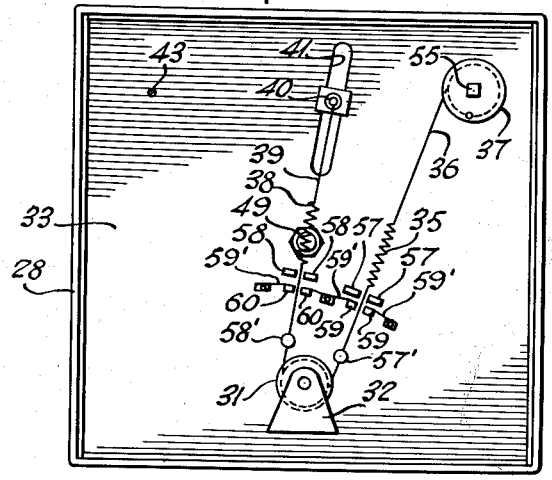
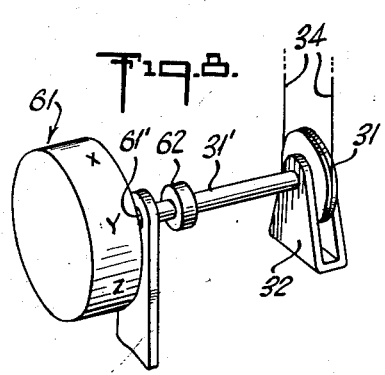
INVENTOR
HOFFMAN E. BRANKER
BY
ATTORNEY Jan. 1, 1963 H. E. BRANKER 3,071,761
VEHICULAR COURSE INDICATOR
Filed Oct. 2, 1957 3 Sheets-Sheet 3

INVENTOR
HOFFMAN E. BRANKER
BY
ATTORNEY

United States Patent Office 3,071,761
Patented Jan. 1, 1963

3,071,761
VEHICULAR COURSE INDICATOR
Hoffman E. Branker, 299 Meadowbrook Road,
Merrick, N.Y.
Filed Oct. 2, 1957, Ser. No. 687,714
17 Claims. (Cl. 340—282)

This invention relates to computing systems and more specifically to a novel and improved method and apparatus for response to two or more quantities for producing a result that is a predetermined function of such quantities The invention is particularly adaptable for use with a novel and improved guide for parking automotive and other vehicles, particularly in cases where limited space is available.

Prior devices proposed as aids to operators of vehicles have been generally unsatisfactory for a number of reasons including relatively high cost, insufficient accuracy and the requirement that the driver operate the vehicle in an unconventional and usually difficult manner to achieve the desired result. With apparatus in accordance with the invention, the foregoing disadvantages with prior devices are overcome and and a clear, accurate and continuous indication is provided so that the driver can back into a parking space easily, quickly and through a direct path, thus avoiding exaggerated movement of the steering wheels through large angles that must be accurately and precisely coordinated with the displacement or movement of the vehicle along the path into the parking position.

Another object of the invention is the provision of a novel and improved computer, for parking aids and other purposes, responsive to at least two signals and producing an output signal that corresponds to a predetermined function of the input signals such as the position of the steering wheels of an automobile and the displacement of the vehicle.

Still another object of the invention is a novel and improved computer and indicator for use as a parking aid.

A further object of the invention resides in the provision of a novel and improved mechanical computer that is characterized by its simplicity, accuracy and low cost and that may be used in a wide variety of applications.

A still further object of the invention is a novel and improved method of relating steering wheel movement with vehicular displacement and producing an accurate amplified indication thereof for the purpose of facilitating the parking of an automobile.

A still further object of the invention is a novel and improved electrical parking indicator for use in parking automobiles.

A further object of the invention resides in the provision of a novel and improved parking aid and indicator therefor.

The above and other objects and advantages of the invention will become more apparent from the following description and accompanying drawings forming part of this application.

In the drawings:

FIG. 4 is a front view of the mechanical computer of FIG. 3 with front face and pointer removed;

Figure 6:
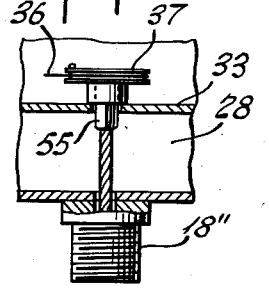
Figure 9:
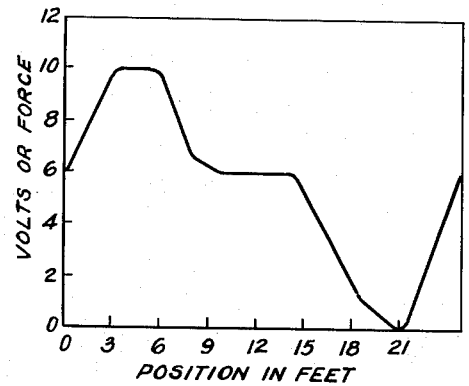
Figure 10:
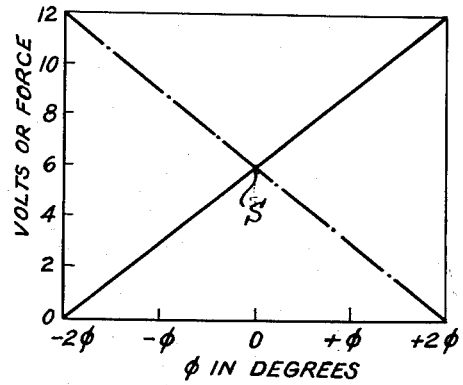
Figure 11:
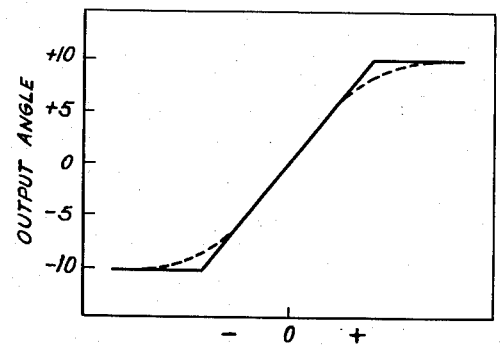
Figure 12:
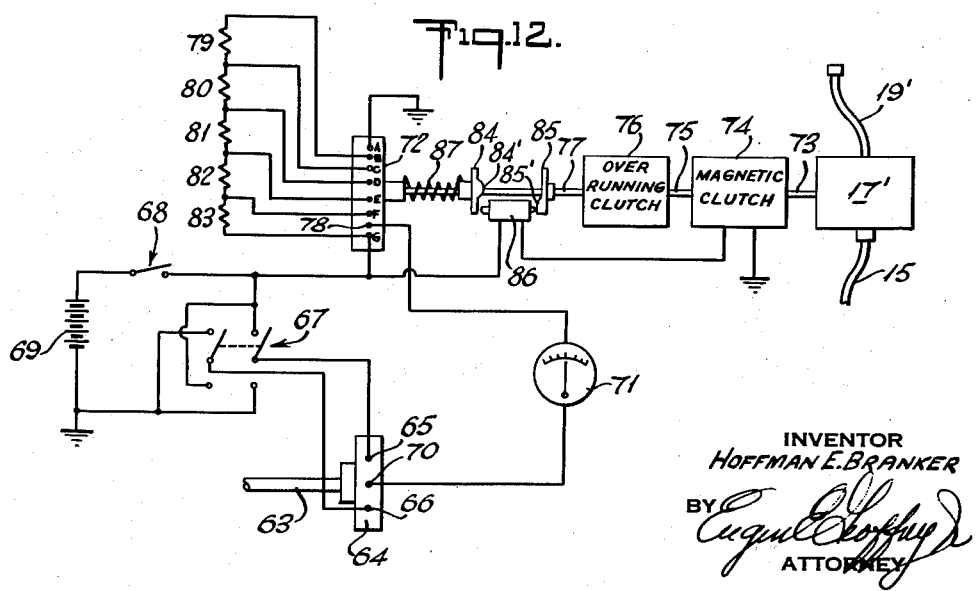

FIGS. 5 and 6 are cross sectional views of FIG. 4 taken along the lines 5—5 and 6—6 thereof;

FIG. 7 is a view of the computer similar to FIG. 4 and illustrating means in accordance with the invention for obtaining non-linear operation;

FIG. 8 is a fragmentary section of the computer shown in FIGS. 3 through 7 wherein the pointer is replaced by a current or voltage varying device;

FIGS. 9 and 10 illustrate the programmed voltages or forces developed for operation of indicators used for parking automotive vehicles in accordance with the invention;

FIG. 11 illustrates the operation of the linear and non-linear computers as shown in FIGS. 4 and 7, respectively; and FIG. 12 illustrates a modified embodiment of the invention.

The apparatus in accordance with this invention is particularly applicable for use as a parking aid for the curbside parking of automotive vehicles though it will be apparent as the description proceeds that the apparatus and portions thereof are useful for other purposes.

Figure 1:
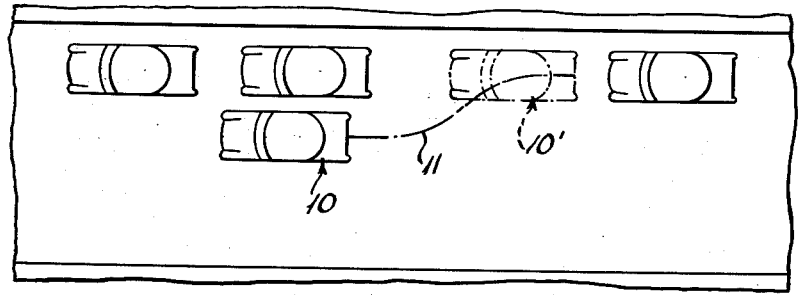
FIG. 1 is a diagrammatic plan view showing an ideal path of travel of the vehicle backing into a space for curbside parking.

In the operation of automotive vehicles the backing of a vehicle into a space is probably one of the more difficult maneuvers and if improperly handled often results in material damage to the tires or even the wheels. The ideal path of travel of a vehicle for movement into a parking space is shown in FIG. 1 and the vehicle to be parked is generally denoted by the numeral 10. For the most convenient and direct path into the parking space the rear wheels of the vehicle should follow the path generally denoted by the numeral 11 until it arrives at the position 10'. The path is smoothly curved and the movement of the vehicle through the path 11 will require minimum movement of the steering wheels to accomplish the maneuver. This invention affords means that will enable an operator to easily and precisely move a vehicle through this ideal path for curbside parking as illustrated in FIG. 1.

One embodiment of the invention arranged for use as a parking aid for automotive vehicles is shown in FIGS. 2 through 5, inclusive. The operation of the indicator generally denoted by the numeral 13 is effected by signals, in this instance mechanical, produced by the operation of the steering apparatus and the physical movement of the vehicle. The displacement of a vehicle when moving into a parking space produces proportional movement of the conventional rotary member within the speedometer cable 15 which is normally connected directly to the vehicle speedometer 16. With the invention, however, the speedometer cable 15 is connected to a mechanical coupling or take-off 17 having one output 18 connected to the indicator 13 and a second output 19 connected to the conventional speedometer 16.

The development of the signal proportional to the movement of the steering wheels of the vehicle may be accomplished in any desirable manner. In the illustrated form of the invention shown in FIG. 2, a flexible cable 20 is connected to the outer end of the steering knuckle shaft 21 carrying the steering arm 22. Coupling of the cable shaft 21 may be accomplished by the use of an adaptor unit generally denoted by the numeral 23.

The signals developed by the cables 18 and 20 are in the form of angular movement of rotary elements and the angular movement is proportional to the movement of the steering wheels and the displacement of the vehicle. In order to move the vehicle 10 through the path 11 as shown in FIG. 1 it is necessary to modify at least one of the signals in a predetermined manner and then combine the signals to produce a resultant signal, the magnitude and direction of which will indicate the deviation of the vehicle from the ideal path. This is accomplished by the indicator 13 shown in FIGS. 3 through 6, inclusive.

The indicator 13 in the illustrated embodiment of the invention is in the form of a computer that receives steering and displacement signals and combines them in a predetermined manner to produce a resultant that will guide the vehicle operator in directing the vehicle through a predetermined path. More specifically, the indicator 13 is provided with a dial 24 that may have calibrations 25 on each side of a center zero marker 26. A pointer 27 pivoted at the lower portion of the indicator is arranged to move either to the right or to the left, depending on the relative magnitudes of the signals being fed to the indicator and the operator need only keep the pointer 27 at the null position in order to properly guide the vehicle. Should the pointer be displaced to one side or the other, the steering wheels are moved sufficiently to bring the pointer back to the center position. As will be shown the indicator 13 affords an exceedingly high degree of sensitivity and at the same time affords a continuous indication so that an operator can easily manipulate the vehicle to follow a precise path.

Referring more specifically to FIGS. 4, 5 and 6, the indicator includes a rectangular housing 28 having a dial 24 and a protective translucent plastic or glass plate 24' closing the front of the housing and held in position by a peripheral member 29. The bottom end of the pointer 27 is bent inwardly at 27' and extends through an arcuate slot 30 and the front face or dial 24. The inner end of the member 27' is secured to a grooved wheel 31 rotatably carried by a U-shaped support 32 fixed to an inner housing member 33. The wheel 31 is rotated by a flexible cable 34 which may be wrapped one or more times about the wheel. One end of the cable is fastened to a spring 35 and the other end of the spring is connected by means of a cable 36 to a wheel or drum 37. The other end of the cable 34 is connected to a second spring 38 and the upper end of this spring is connected by a cable 39 to a shuttle 40 slidably retained within an elongated slot 41. The slot 41 is located with its long axis substantially parallel to the cable 39 and spring 38 so that movement of the shuttle 40 will not impart angular displacement to the spring 38.

With the invention thus far described it is apparent that if the springs 35 and 38 are identical and if the cables 36 and 39 are displaced equal amounts, the pointer 27 and wheel 31 will remain stationary. If the displacements of the cables 36 and 39 are unequal, then the pointer 27 will move an amount proportional to the difference. If it is desired to produce pointer movement that is not directly proportional to the difference between the displacements applied to the cables 36 and 39, the springs 35 and 38 can be modified so that the spring 38, for instance, is twice as strong as the spring 35. In this case the pointer will be at its zero or null position when the displacement applied to the cable 36 is substantially twice that of the cable 39. Other functions may be introduced into the computer by the use of cams such as the cam 42 which in the instant embodiment of the invention operates the shuttle 40 within the slot 41.

The cam 42 in the instant embodiment of the invention defines the course the vehicle will take when moving into a parking space as described in connection with FIG. 1. The particular program utilized for defining the path 11 of FIG. 1 is shown in FIG. 9 and represents the magnitude of the force developed in spring 38 by displacement of cable 39 as the vehicle moves backward into the parking position. Rotation of the cam 42 is affected by the cable 18 driven by the speedometer cable 15 through the take-off 17. The cable 18 is operably connected to the indicator 13 by a connector 18' and rotates a shaft 43 carrying a relatively small gear 44 meshing with a relatively large gear 45. The gear 45 is pivoted at 46 to the back face of the housing 28 and carries a coupling member comprising a flat plate 47 having pins 48 engaging cooperating openings at the back side of cam 42. This coupling arrangement compensates for slight angular differences having the gear 45 and the cam 42, the latter being rotatively carried by a pivot member 49 secured centrally of the inner housing member 33. The shaft 43 extends through the dial 24 and the transparent closure 24' and carries on its outer end a reset knob 50. The reset knob 50 is used to adjust the indicator to a start position before backing into a parking space and for this purpose it is preferable to include an over-running clutch within the mechanical take-off 17 shown in FIG. 2. The over-running clutch also prevents the operation of the computer 13 when the vehicle is moving in the forward direction.

The program cam 42 operates a cam follower 51 in the form of a roller carried by a shaft 52 secured to a shuttle 40. The shaft 52 extends forwardly of the shuttle 40 for attachment of the outer end of the cable 39. A spring 53 is attached at one end to the shaft 52 and at the other end to a fixed pin 54 on the plate 33 to hold the roller 51 tightly against the periphery of the cam 42. With this arrangement the rotation of the cam 42 will cause the shuttle 40 to move lengthwise of the slot 41 and apply more or less stress to the spring 38.

The steering signal produced in cable 20 is applied to a shaft 55 carrying the wheel or drum 37 and for this purpose a connector 18" similar to connector 18' may be employed. (See FIG. 6). As the wheel 37 is rotated it will apply more or less stress to the spring 35.

Figure 3:
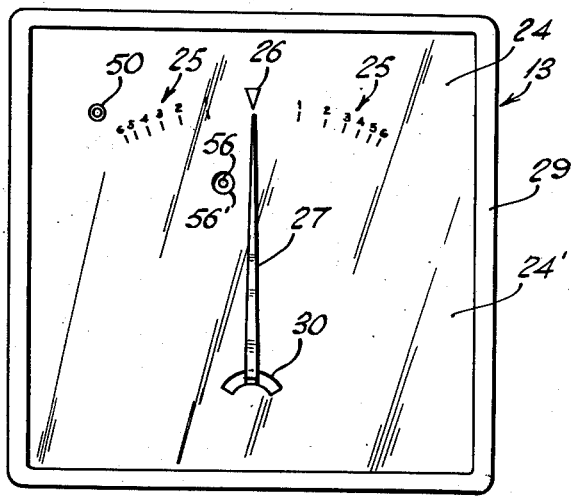
FIG. 3 is a front view of a mechanical computer in accordance with the invention.

With the vehicle 10 in the solid line position as shown in FIG. 1 and with cam 42 set at the start position the operator starts the vehicle moving slowly in a backward direction. Rearward movement of the car produces rotation of the cam 42 and causes the force or stress applied to the spring 38 to gradually increase from 6 units as shown in FIG. 9 to 10 units. The gradual application of this force to the spring 38 will unbalance the pointer 27 and cause it to move to the right as shown in FIG. 3. The operator must start applying a force to the spring 35 by rotation of the steering wheel to the right to hold the pointer substantially at its zero or null position. For a distance of 3 to 6 feet from the starting point the displacement of the shuttle 40 is held constant so that the car has now curved backwardly toward the parking space. The graph shown in FIG. 10 illustrates the force or stress applied to spring 35 by shifting the steering wheel from a center position "S." This stress is a linear function of the angular position of the steering wheel. Since the stress of spring 35 applied by the steering wheel had to be increased during the first 3 feet of rearward motion the steering wheel would have been moved to the right through an angle somewhat greater than $\phi$.

As the vehicle continues its rearward motion from 6 to 9 feet the force or stress on spring 38 is rapidly decreased to about 6 units which requires that the steering wheel be straightened out and brought back to its center position. The movement of the car from 9 to approximately 16 feet brings it well within the parking space and it is now necessary to move the front end of the vehicle toward the curb. The programming takes care of this by rapidly reducing the force on the spring 38 as shown in FIG. 9 from 15 feet to 21 feet. This will require movement of the steering wheel to the left through an angle of approximately $-2\phi$ as shown in FIG. 10. After a distance of 21 feet has been reached the car is approximately in the position indicated at 10' in FIG. 1. If adequate room is available continued backward motion of the car will cause the force applied to spring 38 to rapidly increase to the 6 unit value as shown in FIG. 9 and this will require that the operator move the steering wheel to zero degrees in order to keep the pointer 27 at its zero position. It will be observed that the cam 42 will now have cycled back to its starting position so that the apparatus is ready for the next backing operation. If for any reason the cam is not at its zero position, a suitable marker 56 may be provided on the cam and an opening 56' in the dial 24 so that the operator can reset the cam to the start position by the operation of the reset knob 50.

With the apparatus as described above a relatively high degree of amplification of the signal is obtained and since the operator need do nothing more than maintain the needle 27 at its zero or null position a car can be guided into its parking position through the substantially ideal path as shown in FIG. 1 and without unnecessary, excessive motion of the steering wheels.

In order to limit the motion of the needle or pointer 27 to the right or left, suitable stops may be provided, as for instance, stops 57 and 58 as shown in FIG. 4 which cooperate with members 57' and 58' carried by the cable 34. In certain cases it may be desirable to impart to the pointer non-linear motion as shown in the dotted curve of FIG. 11. The solid curve of FIG. 11 represents the operation of a linear indicator with end stops as shown in FIG. 4. A non-linear instrument, as shown in FIG. 7, includes in addition to stops 57 and 58 the cooperating members 57' and 58' and spring loaded stops 59 and 60. When a ball member such as 57' moves outwardly and engages the stops 59 the supporting springs 59' will retard the movement of the ball 57 and require additional force on the spring 35 to move the ball 57 outwardly until it engages the fixed stops 57. In this way the outer portions of the scales 25 as shown in FIG. 3 will be compressed so that the response of the instrument will behave substantially in accordance with the dotted curve of FIG. 11.

FIG. 8 shows a modification of the computer of FIGS. 3 through 7 wherein the wheel 31 is used to drive a potentiometer 61 or other voltage varying means. In this case the shaft 31' which carries the wheel 31 is extended and is coupled to a shaft 61' of the potentiometer 61 by means of a suitable coupling member 62. With this arrangement and with the terminals $x$, $y$ and $z$ of the potentiometer connected to an electric circuit, the potentiometer 61 will modify the characteristics of the circuit in accordance with the forces or stresses applied to the springs 35 and 38.

Figure 2:
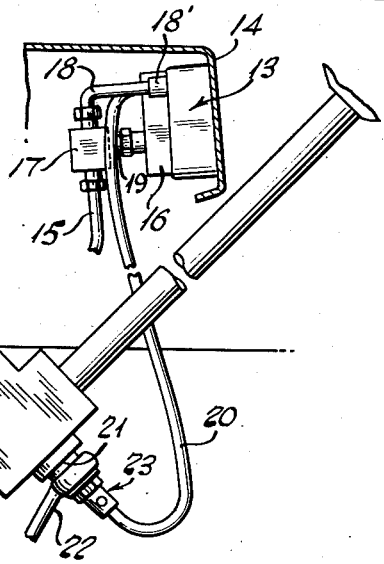
FIG. 2 is a fragmentary section of a vehicle illustrating one procedure for connecting a parking aid in accordance with the invention to the vehicle.

A further embodiment of the invention is shown in FIG. 12 and utilizes an electrical computing system. In this embodiment of the invention the speedometer cable 15 is connected to a gear box 17' of FIG. 2. The upper side of the gear box or take-off 17 as shown in the drawing is provided with a short cable 19' for attachment to the conventional speedometer of the automobile. A signal in the form of a rotary motion obtained from the steering knuckle shaft 21, as shown in FIG. 2, is fed to the shaft 63 of a linear potentiometer or voltage divider 64. The end terminals 65 and 66 of the potentiometer 64 are connected through a reversing switch generally denoted by the numeral 67 and through a power switch 68 to the automobile battery 69. The center arm of the potentiometer 64 is operated by the rotation of the shaft 63 and it is electrically connected to the terminal 70 which in turn is connected to a zero center indicating meter 71.

A programmed potentiometer 72 is driven by the speedometer cable 15 through the shaft 73, a magnetic clutch 74, a coupling shaft 75, an over-running clutch 76, and a second shaft 77. The shaft 77 preferably extends into the potentiometer and carries a movable contact arm connected through the terminal 78 to the other terminal of the indicating meter 71. The potentiometer 72 in the instant embodiment of the invention has a plurality of resistance element taps A through G which are connected to external resistors 79 through 83 for the purpose of obtaining a program corresponding to that as shown in FIG. 9 of the drawings. In addition the shaft 77 carries a pair of cams 84 and 85 for operating a microswitch 86 connected in series with a magnetic clutch 74 and battery 69. A return torsion spring 87 is connected between the fixed housing of the potentiometer 72 and the cam 84 for the purpose of returning potentiometer 72 to the start position after the completion of the backing operation.

In the operation of the embodiment of the invention shown in FIG. 12 the operator positions his car as shown in the full line position of FIG. 1. He then closes switches 67 and 68, the former being closed in one direction for right side parking and in the other direction for left side parking. Since the microswitch 86 is closed, the magnetic switch will be energized and backward movement of the car will transmit power through the over-running clutch from the shaft 75 to the shaft 77, and contact arm of the potentiometer 72. This will produce a voltage change on the potentiometer terminal 78 which is applied to the meter 71. A change in this voltage will cause the needle of the indicating meter to deflect to one side or the other and the operator must turn the steering wheel and rotate the potentiometer 64 in order to balance the voltage and cause the meter needle to return to zero. The backing operation then continues in precisely the same manner as described in the preceding embodiment of the invention except that the meter responds to the difference in two voltages rather than the difference between two mechanical forces. When the shaft 77 has been rotated through one complete cycle it will cause the spring 87 to wind more tightly around the shaft 77 at the same time it will rotate cams 84 and 85. When cam 84 is rotated until the cam surface 84' reaches the switch 86 it will cause it to open, disengaging the magnetic clutch. In so doing the spring 87 will automatically rotate the shaft 77 back to its start position and the cam surface 85' on the cam 85 will close the switch 86. If when backing into a parking position the apparatus does not go through a complete cycle, resetting is automatically accomplished when the main power switch is opened since it will deenergize the magnetic clutch 74.

From the above it is apparent that when the invention is used as a parking aid for automotive vehicles, program cams 42 and program potentiometers 72 can be made for use with specific vehicles to take into consideration different lengths of vehicles as well as different characteristics of steering mechanisms.

While only certain embodiments of the invention have been illustrated and described, it is apparent that modifications, alterations and changes may be made without departing from the true scope and spirit thereof as defined by the appended claims.

What is claimed is:

1. Vehicular course indicator comprising means for producing a continuous signal in response to movement of the steering mechanism of the vehicle, means for producing a continuous signal in response to movement of the vehicle, a null indicator simultaneously responsive to both of said signals to produce a continuous single indication, and means for modifying at least one of said signals fed to said indicator whereupon the operator, by maintaining the indicator at its null position, will automatically guide the vehicle along a predetermined course determined by the modified signal.

2. A vehicular course indicator according to claim 1 wherein said indicator includes a single pointer movable to the right and left of a fixed null position to indicate the degree and direction of departure from said course.

3. A parking aid for assisting the driver of a vehicle in guiding the vehicle into a parking space comprising means for producing a signal in response to movement of the steering wheels of the vehicle, means including an over-running clutch for producing a second signal in response to movement of the vehicle, means for modifying a parameter of said second signal in a predetermined manner, means for algebraically combining said first signal with the modified signal to produce a difference signal and means for continuously indicating the magnitude and direction of said difference signal whereby the driver by maintaining said difference signal at zero through adjustment of the steering wheels will cause the vehicle to follow a path as determined by said modifying means.

4. A parking aid according to claim 3 wherein said indicator includes a pointer pivoted at one end for angular movement, mechanical means for moving said pointer about its pivot, and means for applying mechanical forces to said mechanical means proportional to said first and modified signals, said pointer continuously registering the difference between said signals.

5. A parking aid according to claim 4 wherein said mechanical means includes a circular element rotatively mounted for driving said pointer and a cable engaging said element, said forces being applied to the ends of the cable for moving the element in one direction and the other in accordance with the relative magnitude of the forces.

6. A parking aid according to claim 3 wherein said indicator includes a rotatably mounted wheel, a pointer movable in response to angular displacement of said wheel, a cable engaging the periphery of said wheel, a rotatively mounted drum, a first spring connecting one end of the cable to said drum whereby rotation of the drum will modify the force applied to move said wheel, a linearly movable member, and a second spring connecting the other end of the cable to the last said member, and wherein said modifying means includes a rotatively mounted cam and a cam follower connected to said linearly movable member, said cam being rotated in response to movement of the vehicle and said drum being rotated in response to operation of said steering wheels.

7. In a parking indicator, a computer for comparing at least two signals comprising an angularly movable member, means including a resilient element for applying a force to move said member in one direction, and means including a second resilient element for applying a force to move said member in the other direction whereby said member will move in a direction and to a degree corresponding to the greater force and the magnitude of the difference of said forces wherein said movable member is circular and the force applying means include a cable disposed about the periphery of said member with the ends extending therefrom and springs each connected at one end to the ends of said cable and means for applying forces to the other ends of said springs whereby displacement of the other ends of said springs will cause said member to move through an angle and in a direction corresponding to the difference in forces exerted by said springs on said member.

8. In a parking indicator, a computer according to claim 7 wherein said movable member carries an elongated pointer.

9. A computer comprising a rotary element, a cable encircling said element with the ends extending therefrom, individual spring means connected at one end to each end of said cable, means secured to the other end of each spring means for individually stressing said springs and means carried by said cable for limiting the maximum movement of said element.

10. A computer according to claim 9 wherein said limiting means includes at least one fixed stop and at least one spring loaded stop for imparting non-linearity to the element during at least part of the movement thereof.

11. The method of guiding a vehicle through a predetermined path comprising the steps of producing a signal in response to movement of the steering mechanism of the vehicle, producing a second signal in response to movement of the vehicle along the path, modifying at least one of said signals in a predetermined manner to produce a third signal, combining said modified and other signals, and indicating the magnitude and direction of departures of the third signal from a balanced condition.

12. A computer comprising a rotary element, a cable encircling said element with the ends extending therefrom, individual spring means connected at one end to each end of said cable, means secured to the other end of each spring means for individually stressing said springs, means carried by said cable for limiting the maximum movement of said element, and voltage varying means coupled to said rotary element and actuated by rotation of said element.

13. A parking aid for vehicles having steering means comprising means including a voltage divider having a movable contact thereon, a source of voltage connected with said divider and means coupling said movable contact with said steering means to produce a signal having a magnitude variable in response to operation of said steering means, means for producing a continuous signal in response to movement of the vehicle, the last said means including a non-linear voltage divider connected with said source of power and having a movable contactor thereon, an electrical indicating instrument and connections between said voltage dividers and said instrument to provide an indication corresponding to the relative magnitudes of the voltages produced by said voltage dividers and means for operating said non-linear voltage divider in response to movement of said vehicle.

14. A parking aid according to claim 13 wherein the last said means includes an overrunning clutch and second clutch means for disengaging the non-linear voltage divider from the driving means therefor.

15. A parking aid according to claim 14 wherein said second clutch means includes actuating means engaging and disengaging said clutch and said parking aid includes means for disengaging said clutch at the completion of the parking manouever.

16. A parking aid according to claim 13 wherein the driving means for said non-linear voltage divider includes a clutch for engaging and disengaging said non-linear voltage divider from the driving means, spring means associated with said non-linear voltage divider for returning it to a selected start position when the last said clutch is disengaged and means responsive to actuation of said non-linear voltage divider for disengaging the clutch upon completion of the parking operation, and for reengaging the clutch upon return of the non-linear voltage divider to said selected start position.

17. A parking aid according to claim 16 wherein the driving means for said non-linear voltage divider includes a magnetic clutch.

References Cited in the file of this patent

UNITED STATES PATENTS

| | | |
|---|---|---|
| 1,190,157 | Hall | July 4, 1916 |
| 1,784,922 | Allen | Dec. 16, 1930 |
| 1,809,934 | Glennon | June 16, 1931 |
| 2,022,315 | Jackson | Nov. 26, 1935 |
| 2,362,971 | Bosch | Nov. 21, 1944 |
| 2,459,202 | Thorson | Jan. 18, 1949 |
| 2,492,531 | Lee | Dec. 27, 1949 |
| 2,560,527 | Dehmel | July 10, 1951 |
| 2,736,015 | Gilvarry et al. | Feb. 21, 1956 |